May 25, 1943.  W. H. SILVER  2,319,899
DAMMING CULTIVATOR
Filed Sept. 2, 1939  2 Sheets-Sheet 1
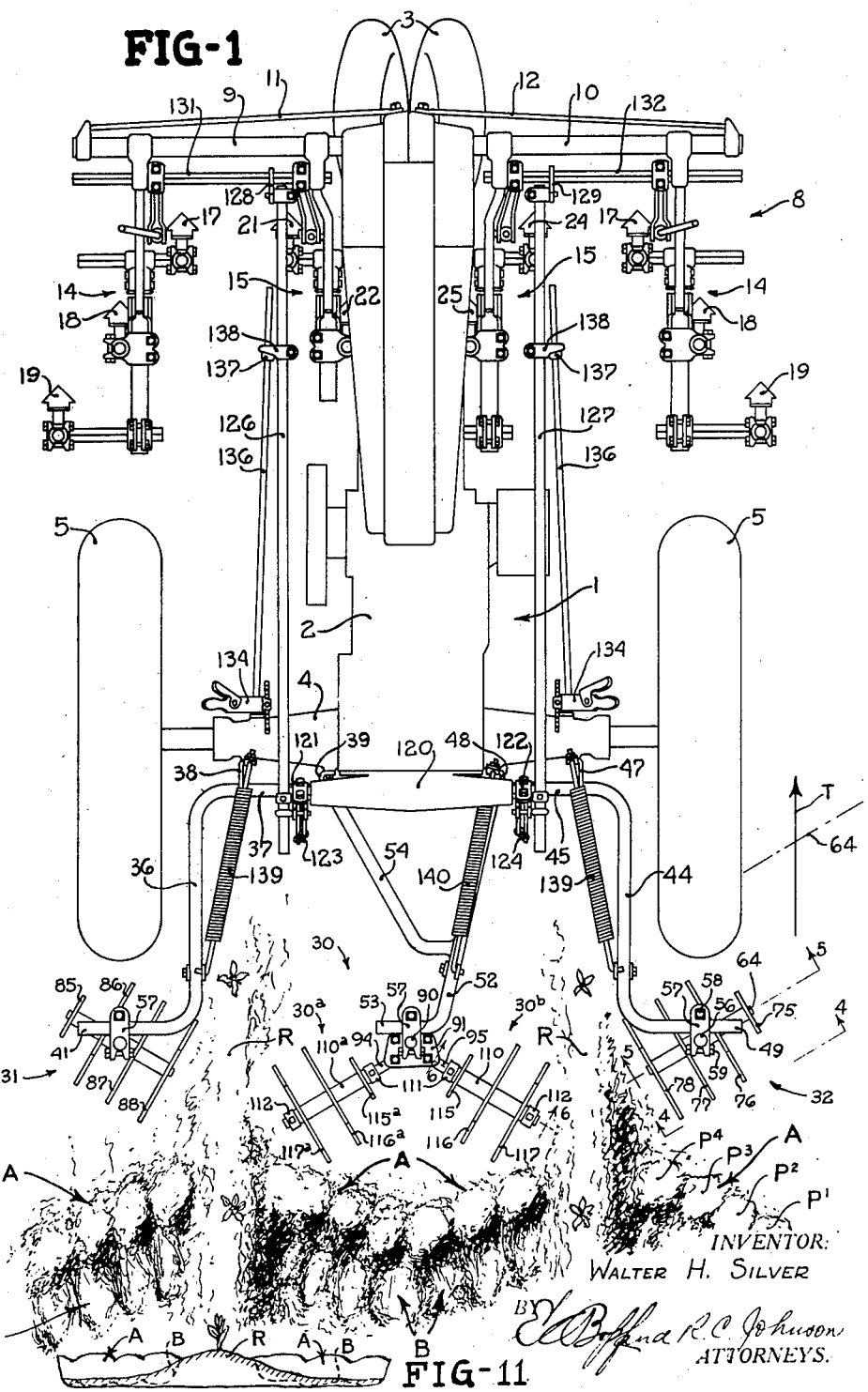

May 25, 1943.  W. H. SILVER  2,319,899
DAMMING CULTIVATOR
Filed Sept. 2, 1939  2 Sheets-Sheet 2
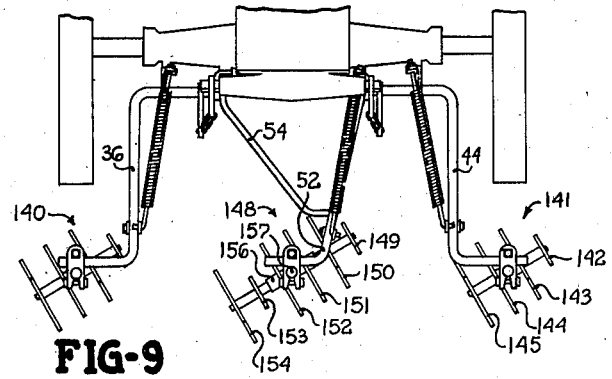
FIG-9
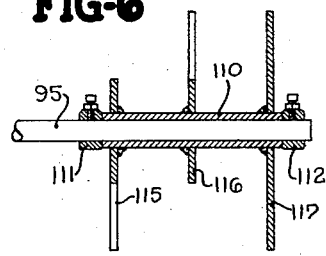
FIG-6
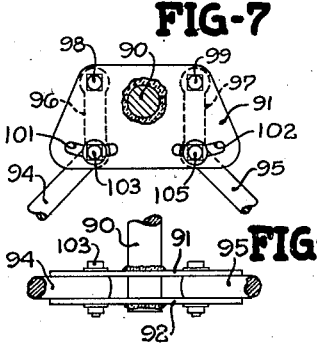
FIG-7
FIG-8
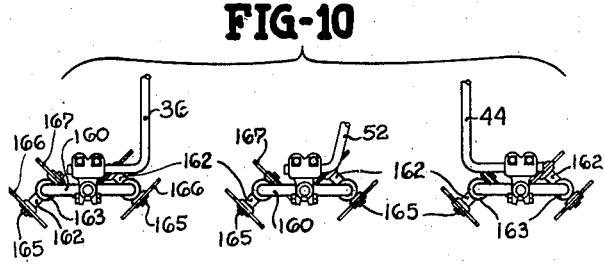
FIG-10
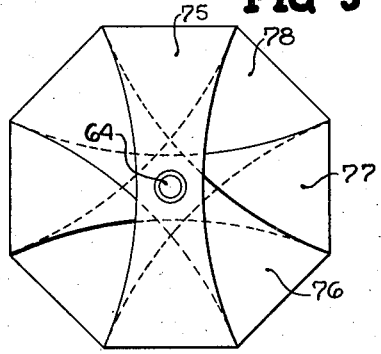
FIG-3
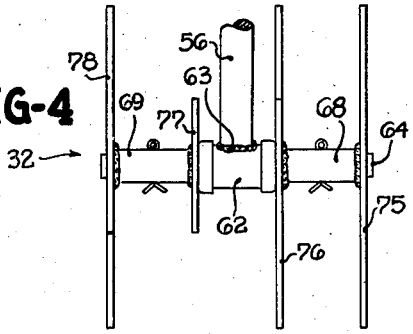
FIG-4
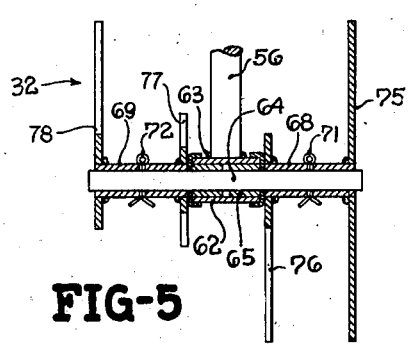
FIG-5
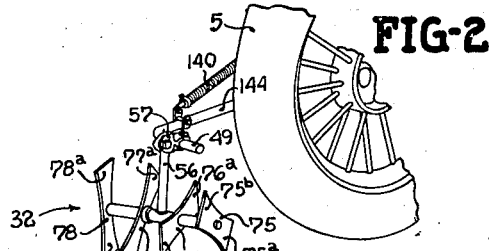
FIG-2
INVENTOR.
WALTER H. SILVER
ATTORNEYS Patented May 25, 1943

2,319,899

UNITED STATES PATENT OFFICE 2,319,899

DAMMING CULTIVATOR

Walter H. Silver, Moline, Ill., assignor to Deere & Company, Moline, Ill., a corporation of Illinois Application September 2, 1939, Serial No. 293,187

41 Claims. (Cl. 97—47)

This invention relates generally to agricultural implements and more particularly to cultivators and like machines for cultivating row crops.

The object and general nature of the present invention is the provision of a tractor mounted cultivator having front cultivating tools, such as shovels or the like, and rear cultivating tools in the nature of rotatable, non-circular blades constructed and arranged not only to work the soil traversed by the front tools and the tractor wheels or other supporting means, but also to work the soil in such a manner that generally transversely extending pockets and/or ridges are formed so as to break up or obliterate any longitudinal tracks formed in the soil by the tractor tools or the tractor wheels or other supporting means. This not only affords a thorough cultivation of the soil but is especially adapted to form numerous moisture retaining pockets and generally transverse ridges or the like across the tracks left by the front tools and the tractor wheels so as to prevent water from running down the row and washing away the valuable top soil.

Another feature of the present invention is the provision of a cultivator unit comprising a set of rotatable blades arranged at an angle to the line of advance and mounted in generally spiral formation arranged so that the forwardmost blade first engages the ground, followed by the next rear disk engaging the ground, and so on, whereby a series of generally transverse depressions and/or ridges are formed in the soil during the forward travel of the machine and the rolling action of the set of blades rotatable about their axis which is inclined or angled with respect to the direction of travel of the machine. Still further, another feature of this invention is the provision of a novel cultivator unit which comprises a pair of rotatable blade sets, each mounted on a pivotally mounted tool bar which may be adjusted generally horizontally to dispose the rotatable blades at different angles with respect to the line of advance.

Still further, another feature of this invention is the provision of new and improved means for mounting one of the blade sets for rotation at the lower end of the associated standard by which the rotatable blade set is carried. It is a further feature of this invention to provide rotatable blade units of this kind which may be incorporated in cultivator rigs in lieu of the usual shovels, sweeps, or other tools usually employed at the present time.

Another important feature of the present invention is the provision of what might be termed a damming unit in the nature of an attachment to be used in place of the usual tools employed in tractor mounted and other implements for working row crops grown on ridges, each unit including rotatably mounted blades which are mounted in axially spaced relation on a rotatable shaft at such an angle to the line of advance that the blades displace portions of the soil so as to form generally transverse dams between the ridges. A further feature of the present invention in this connection is the provision of a unit of this general type constructed and arranged to eliminate wheel tracks and/or furrow marks which might otherwise be left in the soil and afford an opportunity for rains to cause the soil to wash.

These and other objects and advantages of the present invention will be apparent to those skilled in the art after a consideration of the following detailed description, taken in conjunction with the accompanying drawings.

In the drawings:

Figure 1 is a plan view of a cultivator in which the principles of the present invention have been incorporated;

Figure 2 is a fragmentary perspective, showing one of the rear cultivating and dam forming units;

Figure 3 illustrates the spiral relation of the elongated rotatable blades forming the soil working tools of the rear units;

Figure 4 is a view of the right-hand rear unit, taken generally along the line 4—4 of Figure 1;

Figure 5 is a fragmentry section taken generally the line 5—5 of Figure 1;

Figure 6 is a sectional view taken generally along the line 6—6 of Figure 1, showing the right-hand section of the central units;

Figure 7 is a fragmentary view showing the mounting of the center rear sections;

Figure 8 is a rear view looking forwardly of the construction shown in Figure 7; and Figures 9 and 10 show modified forms of rear cultivating and dam forming units; and Figure 11 is a sectional view showing the dams.

The agricultural implement in which the principles of the present invention have been embodied comprises a tractor-mounted cultivator. The tractor is indicated by the reference numeral 1 and includes a tractor body mounted upon forward dirigible wheels 3 and a rear axle 4 having rear driving wheels 5. The implement includes front cultivating means 8 in the form of a pair of draft beams 9 and 10 braced by rods 11 and 12 and carrying a plurality of cultivator rigs 14 and 15 at each side of the tractor 1. The cultivator rigs 14 and 15 are connected with the draft beams 9 and 10 in the usual manner, and each of the outer rigs 14 is provided with a plurality of tools 17, 18 and 19, which may be in the form of shovels, disposed generally forwardly of the rear tractor wheels 5. The intermediate cultivator units are of similar formation, the left-hand unit including tools 21 and 22, and the right-hand unit including tools 24, 25 and a center tool (not shown). The two units 15 work the soil rearwardly of the front wheels 3 and in between the plant rows. The units 14 and 15 are separated by a space sufficient to accommodate the plant rows.

The rear cultivating tools operate in conjunction with the cultivating tools just described, and are arranged generally in rear of the front tools and the tractor wheels so as to work the soil traversed thereby. The rear cultivating means consists of a central unit 30 and left and right hand units 31 and 32. Each of these units consists of a set of narrow elongated blades, the ends of which constitute separate soil engaging sections, interconnected together in spiral relation for simultaneous rotation and arranged to rotate about an axis which is arranged at an horizontal angle with respect to the line of advance the machine. The left hand unit 31 includes a rig beam 36 in the form of a bar having a forward horizontal section 37 journaled for rocking movement in a pair of brackets 38 and 39, carried at the rear of the tractor. The rear portion of the rig beam 36 is bent laterally outwardly, as indicated at 41, and occupies a position generally rearwardly of the left rear wheel 5. The right hand rig beam is indicated at 44 and also includes a forward laterally inwardly directed section 45 journaled upon brackets 47 and 48 carried by the rear axle of the tractor. The rig beam 44 is provided at its rear end with a laterally directed section 49 generally opposite the other laterally directed rig beam section 41. Another rig beam 52 is secured at its forward end to the inner end of the beam section 45 and extends rearwardly and terminates in a laterally directed section 53. A connecting bar 54 is fastened at its rear end to the rig beam 52 and at its forward end to the horizontal section 37 of the rig beam 36. The left set of rotatable blades is adjustably mounted on the horizontal section 41 of the cultivator rig beam 36, the right hand set of rotatable blades is mounted on the horizontal portion 49 of the right-hand cultivator rig beam 44, and the central sets of rotatable blades are mounted on the horizontal portion 53 of the central rig beam 52.

The formation of the several sets of rotatable blades and their construction and arrangement will best be understood by reference to Figures 2 to 5, inclusive, which show in detail the construction of the right-hand set of rotatable blade for the unit 32.

A vertical standard 56 is adjustably fixed at its upper end to the tool bar 44 by means of a double clamp 57 which is secured to the horizontal laterally outwardly extending section 49 of the tool bar or cultivator rig 44. As shown, a bolt 58 secures the clamp 57 to the cultivator rig beam section 49 and a second bolt 59 secures the shank 56 in position in the clamp 57. The unit 32 may be turned to any horizontal position by rotating the shank 56 within the clamp 57, and the unit 32 may be turned to different fore and aft positions, as for leveling the same, by loosening the bolt 58 and rocking the clamp 57. At its lower end the shank 56 carries a bearing sleeve 62, preferably welded thereto, as indicated at 63, and a shaft 64 is supported for rotation in the bearing 62 by suitable bushings 65. A pair of tubular shaft sections or sleeves 68 and 69 are mounted on the extended ends of the shaft 64 by means of cotter pins 71 and 72. A pair of narrow elongated blades 75 and 76 are fixed, as by welding, to the sleeve or tubular shaft section 68, and similarly, a second pair of narrow elongated blades 77 and 78 are fixed to the other sleeve or tubular shaft section 69 by welding or other means. The ends 75a, 75b, 76a, 76b, etc., of the blades 75 to 78 constitute soil engaging sections which are separated circumferentially. The blades 75 to 78 are fixed together in generally spiral formation, and they of course rotate together by virtue of both pairs 75, 76 and 77, 78 being fixed to the shaft 64, as shown in Figure 5. The width of the ends of each blade is such that when the blades are arranged spirally and four are employed, as shown in Figure 2, the blade ends when projected onto a vertical plane normal to the axis of rotation of the blades, a closed figure is formed. As a result of this arrangement at least one end of one blade is always in contact with the soil, irrespective of how shallow the depth of penetration may be.

As best shown in Figure 1, the shank 56 of the unit 32 is secured in the clamp 57 so that the axis of rotation of the blades 75, 76, 77 and 78 is disposed at an angle to the line of advance of the machine. As shown in Figure 1, the axis of rotation of the blades make an angle of approximately 60 degrees with respect to the line of travel of the machine. Normally, the machine shown in Figure 1 is used to cultivate row crops, such as corn, grown on ridges R (Figure 1), the rear tractor wheels 5 and the forward cultivating tools passing down the rows between the ridges. For the right hand unit 32 the axis of rotation of the blades 75 to 78 extends forwardly and generally outwardly to the right when viewing the machine from the rear, and to accommodate this position, the blades 75 are arranged in a left hand spiral when viewing the unit 32 from the rear and looking forwardly and laterally outwardly along the axis of rotation of the blades 75 to 78. This arrangement is indicated in Figure 2, and as a result thereof, when the machine is propelled forwardly, the end 75a (Figure 2) of the blade 75 first engages the soil. Since the plane of the blade is disposed at an angle to the line of advance, as shown in Figure 1, soil is deflected forwardly and to the right, as when viewing the machine from the rear, as the implement moves forwardly. At the same time, the soil pressure acting against the end 75a of the blade 75 causes the interconnected set of blades 75 to 78 to rotate about their axis in a counter-clockwise direction when viewing the unit 32 from the rear and looking forwardly and to the right along the axis of rotation of the blades. This causes the end 75a to work an area of soil somewhat wider in lateral extent than the width of the blade itself, depending partly upon the depth of penetration of the blade and also upon the angle of the axis of rotation which determines the rate of rotation relative to the rate of forward travel. As the rotation of the blades continues, in the manner just stated, due to the pressure of the soil acting against the end 75a, the next rearward blade 76 in the series is rotated so that its end 76a (Figure 2) next comes into contact with the soil, and this occurs before the end 75a of the forwardmost blade 75 leaves the soil. Now as shown in Figure 1, the blade 76 is placed rearwardly of the blade 75 so that, although the end 76a of the blade 76 does not come into contact with the soil until sometime after the end 75a of the blade 75 engages the soil, the point at which the end 76 first engages the soil is disposed generally laterally and not far in advance of the point on the ground where the end 75a first engaged the soil. Thus, where at one point on the ground the end 75a entered the soil and displaced a portion $P^1$, the portion of soil $P^2$ displaced by the end 76a of the next rearward blade 76 lies against and in most cases actually overlaps the displaced soil portion $P^1$ acted upon by the preceding blade end 75a. This is due to the fact that, although the end 75a engaged the soil first, the forward travel of the machine brought the end 76a into such a position that the rotation of the interconnected blades caused the end 76a to enter the ground at a point generally laterally of the point where the end 75a entered the ground. After the continued forward travel of the machine and the rotation of the interconnected blades cause the end 76a to displace its portion $P^2$ of soil, the end 77a of the blade 77 is brought into a position and enters the soil, displacing its portion of soil $P^3$, placing the same alongside and generally overlapping the contiguous portion of soil $P^2$, and lastly the end 78a of the blade 78 is brought into a position to displace its portion $P^4$ of soil against overlapping the portion $P^3$. Thus, the ends 75a, 76a, 77a and 78a of the blades 75 to 78 work the soil, and form a generally transversely extending depression and a ridge of displaced soil extending substantially entirely across the space between adjacent rows R. By the time the end 78a of the blade 78 enters and is displacing its portion $P^4$ of soil, the end 75b of the forwardmost blade 75 is ready to enter the soil, followed by the successive engagement of the ends 76b, 77b, and 78b.

Thus, as the machine goes down the rows, the unit 32 forms a series of generally transversely extending dams or ridges of soil extending from one row of plants to the other. These dams or ridges have several functions. In the first place, the blades 75 to 78 act as cultivating means working the soil. In the second place, the action of the blades in forming generally transverse recesses or pockets and ridges across the space from one row to the other practically entirely obliterate any longitudinal furrows formed by the forward cultivating tools and/or the rear tractor wheels. In the third place, the breaking up of the shovel and wheel marks in the soil and the formation of the transverse ridges across the space between the plant rows effectively prevents water from running down the rows and washing away the valuable top soil. In the fourth place, the transverse depressions formed by the blades in turning up the generally transverse ridges form moisture retaining pockets, especially advantageous in catching moisture so that, instead of running off, water is retained and allowed to soak into the ground. In Figure 1, the dams or transverse ridges thrown up by the several damming units are indicated at A and the pockets or depressions at B.

I have found that where the angle of the axis of rotation of the blades is about as shown, and where the blades are arranged in a left hand spiral so that the forwardmost blade is the one that first enters the soil, followed by the next rearward blades in succession, the damming ridges formed across the space from one row to another extends generally transversely at about the angle shown in Figure 1. The angle at which the unit 32 is placed must be such that the ends of the blades displace generally overlapping sections of soil and, at the same time, rotate at a sufficient rate so that the damming ridges are formed generally transversely instead of being carried along during forward travel of the machine. As at present understood, it is believed to be essential that the direction of spiralling of the blades and the angle which their axis of rotation makes with the line of travel T be as shown in Figure 1, so that during the forward travel of the machine the forwardmost blade 75 enters the ground first, followed by the blades 76, 77 and 78 in that order.

The dam forming tool unit 31 at the left side of the machine (Figure 1) is of substantially the same construction as described above for the unit 32, except that the blades are disposed in the relation of a right hand spiral when viewing the unit from the rear and looking forwardly and outwardly along the axis of rotation, and the axis of rotation of the blades extends forwardly and outwardly to the left, viewing the machine from the rear and looking forwardly. Thus, the lower end of the blade 85 first enters the soil when the machine travels forwardly, followed by the blades 86, 87 and 88 in that order, whereby the ridge thrown up by the blades extends generally transversely between adjacent plant rows. It will be noted that the right hand unit 32 forms a damming ridge extending laterally to the right of the right hand row R approximately half way from that row to the next adjacent row at the right, and that the left hand unit 31 forms a generally transverse damming ridge extending generally laterally from the left row R approximately half way across to the next adjacent row at the left. As will be readily understood, on the next round, these damming ridges will be completed. The center unit 30 is so constructed and arranged as to work the soil entirely across the space between the rows R, the unit 30 being rearwardly of the central cultivator units 15. The unit 30 at the rear of the tractor comprises left and right hand sections 30a and 30b generally of substantially the same construction except that the blades are arranged as right and left spirals.

Referring now more particularly to Figures 1, 6, 7 and 8, the central unit 30 includes a vertical shank 90 mounted on the laterally directed section 53 of the cultivator rig 52 by a clamp 57 similar to or identical with the clamps fixing the units 31 and 32 to their associated cultivator rigs. At its lower end, the shank or standard 90 carries a pair of generally horizontally disposed vertically spaced plates 91 and 92 fastened thereto by welding or the like. A pair of tool bars 94 and 95 have laterally bent forward ends 96 and 97, respectively, which are apertured and receive pivot bolts 98 and 99 carried at the forward portions of the vertically spaced mounting plates 91 and 92. Adjacent its rear edge, each of the latter is provided with a pair of slots 101 and 102 which are arcuate about the axes of the pivot bolts 98 and 99, respectively. A clamping bolt 103 is carried in an aperture at the junction between the end section 96 and the main body of the tool bar 94 and is disposed in the slots 101. Similarly, a clamping bolt 105 is disposed in the other slots 102 and is carried by the right hand tool bar 95. By means of the clamping bolts 103 and 105, the tool bars 94 and 95 may be clamped in adjusted position.

Rotatably mounted on the tool bars 94 and 95 are blade units constructed similarly to the blade units 31 and 32 described above. It will be noted from Figure 1 that the tool bar 94 extends rearwardly and to the left at an angle to the line of advance and that the other tool bar 95 extends rearwardly and to the right at substantially the opposite angle with respect to the line of advance. Each blade unit is of substantially the same construction, except one is a left hand unit and the other a right hand unit, and hence a description of one of said units will be sufficient.

The right unit 30b includes a tubular shaft or sleeve 110 mounted for rotation on the rearwardly and laterally outwardly extending tool bar 94. A pair of collars 111 and 112 are fixed to the tool bar 94 and prevent the tubular shaft 110 from moving axially. Three narrow elongated soil engaging blades 115, 116 and 117 are fixed, as by welding, to the tube 110 so that all of the blades rotate simultaneously. Since the blade 115 is the forwardmost blade, it is arranged so that one end engages the soil first, followed by the engagement therewith as the second rearward blade 116 and then the rearmost blade 117. The blades 115, 116 and 117 are thus arranged in a right hand spiral, considering the same as viewed from the rear and looking forwardly and to the left along the axis of rotation of the unit 30b. The blade unit at the other side and mounted for rotation on the other tool bar 94 is of substantially the same construction except that, as viewed from the rear and looking forwardly and to the right along the axis of rotation thereof, the blades are arranged as a left hand spiral. Otherwise the construction is the same as just described, and the same or similar reference numerals have been employed. In the unit 30a, the rotatable blades 115a, 116a and 117a are fixed by welding or the like to a tubular shaft or sleeve 110a.

Each of the blade units 30a and 30b throw up generally transverse damming ridges in substantially the same manner as described in detail above in connection with the unit 32, with this exception that the transverse damming ridges formed by the units 30a and 30b extend substantially entirely across the space between the rows R.

From the above description it will be seen that the damming tools 30, 31 and 32 not only form damming ridges and moisture retaining pockets but, in addition, cultivate the portions of the soil traversed by the front cultivator units and the front and rear wheels of the tractor. By obliterating the longitudinally extending marks or tracks left by the forwardly moving shovels and rear tractor wheels, the damming tools prevent water from running down the rows or the shovel or wheel tracks and washing away the soil. So far as I am aware I am the first to provide a cultivating machine, such as a tractor mounted shovel cultivator or the like, with means carried at the rear of the tractor for obliterating soil and wheel tracks and working the soil in a generally transverse direction with respect to the line of travel. Also, so far as I am aware, I am the first to prove a row crop machine for cultivating the soil and, at the same time, forming generally transverse damming ridges from one row to the other to prevent water from running rapidly down a row and washing away the soil. From Figure 1 it will be observed that the center unit 30, consisting of the two blade units 30a and 30b, work an area of soil of approximately the same transverse extent of the area of soil worked by the cultivator shovels 21, 22, 24 and 25 as the center shovel, and it will also be observed that the area of soil worked by the outer blade units 31 and 32 is in each case approximately of the same transverse extent as the soil worked by the cultivator shovels 17, 18 and 19, portions of which are traversed by the rear tractor wheels 5.

It will be understood from the above, therefore, that in a machine of this character, having front cultivating means and rear dam forming means, it is desirable to provide means for raising both the cultivating and damming units simultaneously, or adjusting them relative to the other, as desired. To this end, therefore, the tractor 1 is provided with power lift means indicated in this entirety by the reference numeral 120 which includes a transverse rock shaft upon which arms 121 and 122 are fixed. Chains 123 and 124 extend downwardly from the arms 121 and 122 to arms fixed to the horizontal sections 37 and 35 of the cultivator rigs 36 and 44. In addition, operating links 126 and 127 extend forwardly from the arms 121 and 122 to arms 128 and 129 fixed to rock shaft sections 131 and 132 which control the raising and lowering of the several cultivating units 14 and 15. By virtue of this construction, whenever the power lift mechanism 120 is operated, the front cultivating means and the rear damming and cultivating tools are raised and lowered at the same time. A hand lever 134 is mounted at each side of the machine and is connected to a forwardly extending link 136. Each of the links 136 carries a collar 137 which is adapted to engage and serve as a stop for a lug 138 carried on the associated lifting link 126 or 127. Thus, either or both of the hand levers 134 may be set in positions determining the depth of penetration of the forward tools relative to the depth of penetration of the rear damming units. The connection at the rear end of each of the lifting links 126 and 127 with the associated arms 121 and 122 is in the nature of a lost motion connection which permits the rear damming units to be moved into their lower position even though the hand levers 134 may be in their forward positions limiting the downward movement of the cultivator tools at the front end of the tractor. Springs 139 are connected at their rear ends to the rear cultivator rigs and at their forward ends to suitable brackets carried by the tractor. The springs 139 counterbalance the weight of the damming units and associated parts.

Figures 9 and 10 show slightly modified arrangements of the rear damming tools. In Figure 9, the two laterally outer damming units are indicated by the reference numerals 140 and 141, respectively. These units are identical and each includes four narrow elongated soil working blades 142, 143, 144 and 145 fixed together for rotation about an axis that is angled forwardly and to the right, as when viewing the implement from the rear, and hence both sets of blades are arranged in a spiral extending in the same direction. Each of the outer blade units include four blades. The center unit is indicated in its entirety by the reference numeral 148 and includes a set of six blades 149 to 154 inclusive. These blades are also arranged in a spiral and the axis of rotation of the blades extend in the same direction as the axis of rotation of the blades of the units 140 and 141. In each case, the foremost blade engages the ground first, followed by the next rear blades in succession, whereby generally transversely extending damming ridges are formed. It will be noted in Figure 9 that the blades of all three units throw the soil in the same general direction, namely to the right during the forward travel of the machine. Unlike the central unit 30 shown in Figure 1, the central unit 148 of Figure 9 includes a yoke 156 fixed to a central standard 157 clamped to the cultivator beam 52. At its lower end the yoke 156 rotatably receives the shaft upon which the several blades 149 to 154 are mounted.

Figure 10 discloses an arrangement in which each laterally outer and center unit includes a yoke 160 having downwardly extending arms which receives a T-shaped bearing member 162, the vertical sleeve section 163 of which is adapted to be fixed to the associated arm of the yoke 160 in adjusted angular position. The bearing member 162 rotatably receives a shaft 165 on which a pair of blades 166 and 167 are mounted in spaced apart relation, with one blade displaced an angle of 90 degrees with respect to the other about their axis of rotation. The several sets of blades 166 and 167 work the soil in substantially the same manner described above and form generally transverse damming ridges across the portions of the soil traversed by the tractor wheels and cultivator means at the front end of the tractor. It will be observed that the sleeve section 163 of each of the bearing members 162 is not disposed in the exact center between the associated rotatable blades, but is placed closer to one blade than the other. This permits one unit to be mounted slightly in advance of the other so that the blade units may be placed fairly close together so as to work the soil between the rows but without having the inner blade of one set strike the inner blade of the adjacent set. Since the blades 166 and 167 of each of the units are disposed at an angle of 90 degrees with respect to each other about their axis of rotation, any unit may be turned to any desired angle.

While I have shown and described above the preferred means in which the principles of the present invention have been embodied, it is to be understood that my invention is not to be limited to the specific means shown and described, but that, in fact, widely different means may be utilized in the practice of the broader aspects of my invention.

What I claim, therefore, and desire to secure by Letters Patent is:

1. An agricultural implement comprising a plurality of blades having separate soil engaging sections fixed together for simultaneous rotation at an angle to the line of advance of the implement, said blades being disposed generally in spiral formation about said axis and arranged so that when the implement is drawn in contact with the ground, the forwardmost section first engages the ground, followed by the engagement of the next rearward sections with the ground in succession, and said angle being such that the area worked by one section lies generally contiguous, generally transversely with respect to the line of advance, to the areas worked by adjacent sections.

2. An agricultural implement for use with row crops grown on ridges, comprising a frame, ground-engaging supporting means therefor adapted to traverse the ground between the ridges, a plurality of blades interconnected together in uniformly spaced relation for concomitant rotation, each blade having separated soil-engaging sections, means supporting said blades for rotation about an axis disposed at an angle to the line of advance, said angle and the circumferential extent of each section being such that the soil worked by the sections is displaced generally laterally outwardly away from the adjacent ridges and forms generally transversely extending dams therebetween.

3. A damming tool comprising a set of elongated blades having substantially flat end portions engageable with the soil, said blades being interconnected together for simultaneous rotation about an axis disposed at an angle with respect to the line of advance such that the pressure of the soil against the blades causes the latter to rotate, the blades being arranged angularly about said axis so that the flat ends of the blades successively enter the soil at an angle to the line of advance and displace contiguous portions of the soil to form damming ridges extending generally transversely with respect to the line of advance.

4. The combination with a tractor having ground-engaging supporting means, of a plurality of inter connected soil working blades mounted behind said ground-engaging supporting means and arranged for rotation at an angle to the line of advance so as to form ridges in the soil extending generally transversely with respect to the line of advance of the tractor, thereby obliterating any tracks left in the soil by said ground-engaging supporting means.

5. The combination with a tractor having rear wheels, of a plurality of interconnected soil working blades mounted behind said wheels and arranged for rotation at an angle to the line of advance so as to form ridges in the soil extending generally transversely with respect to the line of advance of the tractor, thereby obliterating any tracks left in the soil by said wheels, there being a set of said blades behind each rear wheel, the axes of rotation of the two sets of blades being arranged at opposite angles with respect to the line of advance, and one of said sets of blades being connected together in the relation of a right-hand spiral and the blades of the other set being connected together in the relation of a left-hand spiral.

6. The combination with a tractor having rear wheels, of a plurality of interconnected soil working blades mounted behind said wheels and arranged for rotation at an angle to the line of advance so as to form ridges in the soil extending generally transversely with respect to the line of advance of the tractor, thereby obliterating any tracks left in the soil by said wheels, there being a set of said blades behind each rear wheel, the axes of rotation of the two sets of blades extending at generally the same angle with respect to the line of advance and the blades of each set being arranged spirally in substantially the same direction.

7. A cultivator rig comprising a rig beam, a generally vertically disposed shank fixed to said beam, a shaft carried at the lower end of said shank, a generally horizontally disposed sleeve carried by said shaft, and a plurality of narrow elongated flat soil engaging blades fixed to said sleeve in axially spaced relation and in planes substantially perpendicular to the axis of said shaft.

8. In an agricultural implement, a tool unit comprising a standard, a pair of plates fixed to said standard in spaced apart relation, a tool bar disposed between said plates and pivoted at one end thereto, each of said plates having an arcuate slot formed therein, and means carried by said tool bar and disposed in said slots for fixing said bar to said plates in adjusted position.

9. A tool unit as defined in claim 8, further characterized by each of said plates having a second slot therein, a second tool bar disposed between said plates and pivoted at one end thereto, the second bar having means disposed in the associated set of slots for fixing it in adjusted position and the outer portions of said tool bars flaring outwardly, and tool means carried by the outer portions of said tool bars.

10. A cultivator unit comprising a supporting member, a pair of tool bars secured to said supporting member and extending outwardly therefrom in divergent relation, and a set of narrow elongated cultivator blades secured together for simultaneous rotation on each of said tool bars, the latter being arranged so that the planes of rotation of the blades of one set lie at an angle with respect to the plane of rotation of the other set one of said sets of blades being connected together in the relation of a right-hand spiral and the blades of the other set being connected together in the relation of a left-hand spiral.

11. A cultivating implement comprising the combination of a supporting frame, cultivating tool means carried by said frame, a set of soil engaging blades fixed for simultaneous rotation about an angle at an axis to the line of advance and disposed in a position longitudinally rearwardly of said cultivating tool means so as to work the soil traversed by said cultivating tools, said blades being shaped and disposed with their axis of rotation at such an angle relative to the line of advance that said blades form moisture retaining pockets and dams in the soil worked by said cultivating tools, and means carried by the supporting frame for rotatably supporting said blades.

12. A cultivating implement comprising a combination of a tractor having ground engaging supporting and propelling means, cultivating tool means adapted to work the soil adjacent the line of travel of said tractor supporting and propelling means, and a plurality of rotatable blades fixed to rotate together at predetermined relative angular positions about an axis disposed at an angle to the line of advance and engageable with the soil in rear of both said tool means and said tractor supporting and propelling means, the angle of the axis of rotation of said non-circular blades and the angular relation between the latter being such that said blades form generally transverse ridges which serve as dams extending generally across any furrows formed by said supporting and propelling means and said tool means.

13. A cultivating implement comprising the combination of a tractor having supporting wheels, a laterally outwardly extending tool beam at each side of the tractor adjacent the forward end thereof, ground engaging tool means carried by said beam and arranged to work the soil adjacent the line of travel of the tractor wheels, a pair of cultivator rigs carried adjacent the rear end of the tractor, each rig including a rig bar having a laterally outwardly extending portion disposed generally rearwardly of the associated tractor wheel, a standard fixed to the laterally outwardly extending potrion of each rig, a shaft disposed for rotation about an axis at an angle to the line of advance of the tractor, a plurality of narrow elongated blades fixed at their generally central portion to said shaft for rotation therewith, said blades being mounted on said shaft in generally spiral formation arranged so that the soil engaged by the ends of said blades is displaced generally laterally of the line of advance and the lateral extent of said blades being sufficient to cause them to break up any longitudinal tracks left by said tractor wheels and tool means.

14. A damming tool comprising a part rotatable about an axis disposed at an angle to the line of travel with the right end in advance of the left end, and a plurality of narrow flat blades fixed to rotate with said part about said axis, said blades being arranged on said part in the relation of a left hand spiral and disposed substantially in planes perpendicular to said axis, so as to enter the ground at an angle to the line of travel and thereby form dams.

15. A damming tool comprising a part rotatable about an axis disposed at an angle to the line of travel with the left end in advance of the right end, and a plurality of narrow flat blades fixed to rotate with said part about said axis, said blades being arranged on said part in the relation of a right hand spiral and disposed substantially in planes perpendicular to said axis, so as to enter the ground at an angle to the line of travel and thereby form dams.

16. A cultivating implement comprising the combination of a tractor having supporting wheels, a pair of cultivator rigs carried adjacent the rear end of the tractor, each rig including a rig bar having a laterally outwardly extending portion disposed generally rearwardly of the associated tractor wheel, a standard fixed to the laterally outwardly extending portion of each rig, a shaft disposed for rotation about an axis at an angle to the line of advance of the tractor, a plurality of narrow elongated blades fixed to said shaft for rotation therewith, said blades being mounted on said shaft in generally spiral formation arranged so that the soil engaged by the ends of said blades is displaced generally laterally of the line of advance and the lateral extent of said blades being sufficient to cause them to break up any longitudinal tracks left by said tractor wheels.

17. The combination with a tractor having ground engaging supporting means, of a plurality of interconnected soil engaging blades mounted behind said ground engaging supporting means and arranged for rotation at an angle to the line of advance so as to form moisture retaining pockets spaced generally transversely with respect to the line of advance of the tractor, thereby obliterating any tracks left in the soil by said ground engaging supporting means.

18. The combination with an implement having ground engaging supporting means, of a plurality of interconnected soil working blades mounted behind said ground engaging supporting means and arranged for rotation at an angle to the line of advance so as to form moisture retaining pockets in the soil extending generally transversely with respect to the line of advance of the implement, thereby obliterating any tracks left in the soil by said ground engaging supporting means.

19. A cultivator rig comprising a rig beam having a generally laterally directed section, a generally vertically disposed shank having at its lower end a rotatable ground engaging unit comprising a set of narrow elongated generally flat blades disposed generally in planes perpendicular to the axis of rotation of said unit and fixed against relative rotation in generally spiral relation, and means for securing the upper portion of said shank to the laterally directed section of said rig beam in a plurality of adjusted positions about a generally vertical axis so as to dispose said unit with its axis of rotation at various horizontal angles relative to the line of advance of the cultivator.

20. A dam forming unit comprising a pair of tool supporting bars extending generally longitudinally in laterally outwardly divergent relation, and a set of narrow elongated cultivator blades secured together for simultaneous rotation on each of said tool bars, the latter being arranged so that the planes of rotation of the blades of one set lie at an angle with respect to the plane of rotation of the other set, one of said sets of blades being connected together in the relation of a right-hand spiral and the blades of the other set being connected together in the relation of a left-hand spiral.

21. The combination with a tractor having ground-engaging supporting means, of a plurality of interconnected soil working blades mounted behind said ground-engaging supporting means and arranged for rotation at an angle to the line of advance so as to form moisture retaining pockets in the soil behind said ground-engaging supporting means, and means supporting said soil working blades on the tractor for rotation.

22. An attachment for an agricultural implement, comprising a shank adapted to be disposed generally vertically, a pair of generally vertically spaced horizontally extending plates connected to the lower end of said shank, and soil working means including a tool bar mounted in position between said plates.

23. An attachment for an agricultural implement, comprising a shank adapted to be disposed generally vertically, a pair of generally vertically spaced horizontally extending plates, a pair of tool supporting bars mounted in position between said plates and extending generally longitudinally in laterally outward divergent relation, and tool means on said bars.

24. An attachment for an agricultural implement, comprising a tool beam, a plurality of soil working blades shaped to form moisture retaining pockets in the soil, and means connected with said beam for supporting said blades for rotation about divergent axes.

25. An agricultural implement comprising the combination of a tractor of the tricycle type having laterally spaced rear wheel means and centrally disposed front wheel means, a plurality of beams carried by the tractor at the rear thereof and extending generally rearwardly therefrom, one behind each of said rear wheel means and the other longitudinally rearwardly of said front wheel means, and means carried at the rear portion of each of said beams for forming moisture retaining pockets in the soil back of said front and rear wheel means.

26. An agricultural implement comprising the combination of a tractor of the tricycle type having laterally spaced rear wheel means and centrally disposed front wheel means, a tool supporting beam carried by the tractor at the rear thereof generally centrally of the tractor, and means carried by said beam generally longitudinally rearwardly of said front wheel means for forming moisture retaining pockets in the soil back of said front wheel means.

27. An agricultural implement as defined in claim 25, further characterized by each of said moisture retaining pocket forming means comprising a pair of soil working blade units connected together for rotation about rearwardly divergent axes.

28. An agricultural implement as defined in claim 25, further characterized by the moisture retaining pocket forming means longitudinally rearwardly of said front wheel means comprising a pair of soil working blade units connected together for rotation about rearwardly divergent axes and the other two moisture retaining pocket forming means comprising soil working blade units rotatable about axes which converge rearwardly.

29. An agricultural implement as defined in claim 25, further characterized by each of said moisture retaining pocket means comprising a gang of substantially flat soil working blades arranged so that the ends thereof enter the soil at an angle to the line of advance, the axes of rotation of said gangs being substantially parallel and extending at an angle to the line of advance.

30. An agricultural implement for use with row crops grown on ridges, comprising a frame, ground-engaging supporting means therefor adapted to traverse the ground between the ridges, a plurality of blades interconnected together in uniformly spaced relation for concomitant rotation, each blade having separated soil-engaging sections, means supporting said blades for rotation about an axis disposed at an angle to the line of advance, said angle and the circumferential extent of each section being such that the soil worked by the sections is displaced generally laterally with respect to the adjacent ridges and forms generally transversely extending dams therebetween.

31. In combination, a frame including a ground support, a ground-working tool spaced laterally of the ground support, and means carried by the frame rearwardly of the ground support for forming moisture retaining pockets generally rearwardly of and in the path of the ground support and adapted to deposit soil into the path formed by the ground-working tool.

32. In combination, a frame including a ground support, a ground-working tool spaced laterally of the ground support, and means carried by the frame rearwardly of the ground support for forming moisture-retaining pockets in the path of the ground supoprt, said means including an element having a surface inclined to the path of travel of the ground support and adapted to form dams in the path of the ground-working tool.

33. In combination, a frame including a ground support, a ground-working tool spaced laterally of the ground support, and means carried by the frame rearwardly of the ground support for forming pockets in the path of the ground support, said means including a rotatable soil-engaging member mounted on an axis of rotation inclined to a vertical plane through the furrow, said member being non-circular with respect to its axis of rotation and having a portion forming at least one circumferential soil engaging section.

34. In combination, a frame including a ground support, a ground-working tool spaced laterally of the ground support, and a means carried by the frame rearwardly of the ground support for forming moisture retaining pockets in the path of the ground support, said means including a rotatable soil-engaging member mounted on an axis of rotation inclined to the vertical plane of the path of said tool, said member having circumferentially spaced soil-engaging portions.

35. In combination, a cultivator element adapted to form a furrow, and means disposed in a position for forming spaced moisture retaining pockets in the soil at one side of the furrow, said means including an element having a surface inclined to the furrow and adapted to deflect soil cut out from the moisture retaining pockets into the furrow so as to form a dam across the furrow.

36. The combination with a tractor having ground-engaging supporting means, of basin-forming tool means mounted behind said ground-engaging supporting means and arranged for rotation at an angle to the line of advance so as to form moisture retaining pockets in the soil behind said ground-engaging supporting means, and means supporting said basin-forming tool means on the tractor for rotation.

37. An attachment for an agricultural implement, comprising tool beam means including a pair of rearwardly divergent sections and a plurality of soil working blades carried by said divergent sections and rotatable about divergent axes, said blades being shaped to form moisture retaining pockets in the soil.

38. An agricultural implement comprising the combination of a tractor of the tricycle type having laterally spaced rear wheel means and centrally disposed front wheel means, a plurality of beams carried by the tractor at the rear thereof, and means carried by said beams for forming moisture retaining pockets in the soil back of said front and rear wheel means.

39. A damming tool comprising a mobile support, a generally transverse member carried thereby having means adjacent its ends serving as a tool-receiving section, and a dam forming unit connected with each section, each unit comprising a pair of earth-engaging non-circular members, a shaft to which said members are fixed, and a bearing member rotatably receiving said shaft and connected with the associated tool-receiving section.

40. A damming tool comprising a mobile support, a generally transverse member carried thereby having means adjacent its ends serving as a tool-receiving section, and a dam forming unit connected with each section, each unit comprising a pair of earth-engaging non-circular members, a shaft to which said members are fixed, a bearing member rotatably receiving said shaft, and means connecting each bearing member with the associated tool-receiving section for adjustment about an axis to vary the angle of said bearing member.

41. A damming tool comprising a mobile support, a generally vertical tool-supporting member, a shaft-receiving bearing member at the lower end thereof, a shaft carried therein and disposed at an angle to the line of advance of said mobile support, and non-circular members fixed to the ends of said shaft for forming depressions in the soil.

WALTER H. SILVER.

CERTIFICATE OF CORRECTION.

Patent No. 2,319,899.  May 25, 1943.

WALTER H. SILVER.

It is hereby certified that error appears in the printed specification of the above numbered patent requiring correction as follows: Page 1, second column, line 39, before the word "central" insert --rear--; page 6, first column, line 74, claim 13, for "potrion" read --portion--; page 7, second column, line 55, for "supoprt" read --support--; and that the said Letters Patent should be read with this correction therein that the same may conform to the record of the case in the Patent Office.

Signed and sealed this 6th day of July, A. D. 1943.

Henry Van Arsdale,
(Seal)  Acting Commissioner of Patents.